INVENTORS
GAMES SLAYTER
HARRY B. WHITEHURST
BY WILLARD L. MORGAN

ATTORNEYS

INVENTORS
GAMES SLAYTER
HARRY B. WHITEHURST
BY WILLARD L. MORGAN
ATTORNEYS

3,047,409
METHODS FOR COMBINING METALS AND COMPOSITIONS CONTAINING METALS WITH GLASS AND MATERIALS PRODUCED THEREFROM
Games Slayter and Harry B. Whitehurst, Newark, Ohio, and Willard L. Morgan, Pittsburgh, Pa., assignors to Owens-Corning Fiberglas Corporation, Toledo, Ohio, a corporation of Delaware
Filed Feb. 3, 1955, Ser. No. 485,862
9 Claims. (Cl. 106—47)

This invention relates to metals and to compositions containing metals and more particularly to metals and compositions which are modified by the addition of high tensile strength glass to such metals and compositions.

Many metals having desirable properties also have shortcomings which make them unable to withstand the conditions and uses to which they might otherwise advantageously be put. Aluminum, for example, is widely used in the aircraft industry because of its extreme lightness. Many parts which preferably should be made of aluminum cannot, however, be fabricated from that material because in their normal uses they are subjected to heat to such a degree that the tensile strength of the aluminum is so lessened that the parts cannot withstand the stresses encountered. Such loss of tensile strength at elevated temperatures has necessitated the use of other metals, even though it sometimes entailed substantially increased cost and weight in the finished parts.

In addition, aluminum suffers from a further difficulty when it is subjected to substantial stresses under heat. The material tends to lose its dimensional stability and to "creep," so that a part fabricated from aluminum gradually changes its shape under such conditions.

Lead sheathed cables have long been used in the communications and electrical fields because of their relative inertness to the elements and to the materials encountered in the earth and because they are waterproof. While lead sheathed cables are extremely advantageous from these standpoints, the weight of the lead is high and its tensile strength is low and, therefore, particularly if the cables are to be strung in the air, they must also incorporate strands or wires of steel or other high tensile strength materials to support their weight. If the lead or lead alloy used for the sheath could be given high tensile strength then the incorporation of the high cost steel would not be necessary. A similar problem is met in stranded aluminum electrical cables where aluminum strands are the conductor. Because of the relatively low tensile strength of the aluminum, it is unable to support itself so a core of steel is employed to carry the load. If the aluminum could be improved, without substantial loss of its conductivity, the steel core might be eliminated and the weight of the cable reduced.

In addition to its low tensile strength, lead suffers from a tendency to "creep" so that its utilization in many places, even where but little tensile strength is required, is avoided since parts fabricated from the metal do not retain their shapes under the conditions encountered. An improvement in the strength of lead in this respect would render it much more widely applicable for the frabrication of parts of machinery and other equipment. As an illustration of the failure of lead where but little tensile strenth is required, the use of lead linings for tanks or conduits, for example, for corrosive materials, is made difficult by the fact that the mere weight of the lead causes it to deform. As a result the lead walls must be "shored up" to prevent this deformation. Elimination of this tendency to "creep" would simplify this and many other utilizations of the metal.

Many metals, including many having relatively low melting points, become very fluid, having a very low viscosity when melted. These low viscosity metals are harder to handle in many forming operations than they would be if their viscosities were higher.

In addition to these physical limitations which exist in the metals mentioned and in many other metals, other difficulties resulting from the natures of the metals, such as the unfortunate combination of low strength and high density, susceptibility to corrosive attack, high heat or electrical conductivity in metals which might otherwise be utilized where such high conductivity is not desirable, low impact resistance accompanied by high density and similar combinations of desirable and undesirable qualities, limit their uses.

Thus, if it were possible to retain or improve the desirable qualities of a specific metal while lessening its undesirable qualities the fields of utilization of each metal thus modified would be greatly amplified.

Preferably, any material used in combination with metals or compositions including metal should be one which is easy to bond to and disperse through the metal or composition, and it should be one which can be placed in or combined or associated with the metal with facility. It must be a material which is not injured by the temperature to which the metal or composition is raised during its fabrication, i.e., its drawing, casting, molding, stamping, forging, extruding or other shaping step. Furthermore, the material to be included must be able to undergo not only the temperature treatment but the mechanical treatments to which the metal is subjected during its fabrication into a finished product. It has been discovered that film glass produced, for example, as taught in Slayter Patent No. 2,457,785, is such a material.

The mentioned Slayter Patent No. 2,457,785 discloses an apparatus in which molten glass is flowed through an annular orifice in the bottom of a glass supply device so a tubular structure of thin glass is formed as the glass cools. As the tube begins to solidify, but while it still remains plastic, it is flattened and gripped between the peripheries of a pair of rollers which are rotated at a substantial speed to feed the flattened tube downwardly. This longitudinal movement attenuates the sheet of glass after it leaves the orifice and, under proper control as to temperatures, etc., a flattened tube of glass is produced. The double ribbon or flattened tube of glass can be led away and shattered to produce flakes or platelets of glass or it may be retained as a film, if desired. By proper control over the conditions of operation, it has been found that these flakes or platelets may be kept substantially flat or they may be curled. The film can be produced with a high degree of control as to its thickness; as little, say, as 8 microns or less or substantially thicker, if desired, for instance .006 to .010 inch. The film or flakes produced have a tensile strength in the order of 200,000 p.s.i., far higher than most metals. Their Young's modulus, di-electric strength and other characteristics and properties are constant.

It is the principal object of this invention to provide methods, apparatuses and processes for the incorporation of glass film or flakes into and with metals and compositions including metals in order to impart improved qualities to the resulting compositions and in order to provide improved products consisting of compositions that comprise metals or compositions including metals and glass.

In practicing the processes and teachings of the instant invention it has been discovered that the characteristics of metals, when combined with or reinforced by glass flakes according to the invention are substantially altered. or example, the addition of glass flakes, suitably handled to secure intimate bonding with the metal, results in improving the strength to weight ratio in most instances; probably by lowering the apparent density while augmenting the strength of the mass.

Dimensional stability, impact strength and fatigue strength, particularly at high temperatures, are all substantially improved. In a sense these improvements result from the ability of the glass in the admixture to limit the elasticity and plasticity of the metal. As a specific example, aluminum admixed with glass flakes according to the invention breaks under flexural or tensile stress without appreciable prior deformation.

The mixture of metals or compositions containing metals with glass according to the invention greatly increases their resistance to corrosion, particularly at elevated temperatures.

Particularly in the cases of expensive metals such as titanium, the admixture of glass flake with the metal reduces the cost of the finished product without any serious loss in the quality of the finished product, by reducing the quantity of metal in the product.

From the standpoint of working or fabricating metals and compositions containing metals to which glass flakes have been added according to the invention, many advantages also accrue. By increasing the viscosity of the metal at its melting temperature, particularly with respect to low melting point metals, extrusion of the metals is made more easily controllable. The utilization of glass flakes according to the invention makes possible the reinforcement of extruded metal in all directions.

The utilization of glass flakes in metals according to the invention provides for the formation of masses by sintering of the contained glass, frequently under conditions where sintering of the metal phase of the compositions would be difficult if not impossible. This provides for the formation of metallic parts having characteristics substantially different from those of similar parts fabricated entirely from metal. For example, a sintered magnetic core containing glass has an appreciably lower magnetic strength and altered hysteresis when compared to the same core fabricated entirely from metal. Even in products where metal is present to a greater degree and thus the sintering takes place between the metal particles, for example, at a higher temperature, the presence of the glass in the finished mass acts to provide characteristics differing from those of the solid metal mass in line with the general discussion appearing above.

Many of the foregoing improved results, while stemming from qualities of the glas in the admixture, are achievable solely through the practice of the instant invention since the addition of glass to the metal in sufficient quantity to produce these results is extremely difficult, if not impossible, when utilizing glass in other forms. The two dimensional extent of flakes or platelets provides strength in both directions to a degree much higher than is possible with granular or powdered forms or the elongated forms such as fibers or continuous filaments.

Flake glass may be produced according to Slayter Patent No. 2,457,785 by maintaining a supply of molten glass in a melter or glass tank 10 (FIG. 1) through the center of which there extends a well 11. The well 11 encloses one, two or more pipes 12 and 13 which extend downwardly through the well 11 to a level at least beneath the bottom of the tank 10 and interiorly of a generally horizontal annular orifice 14. Either or both of the pipes 12 and 13 may be provided with spray heads, for example, the spray head 15 shown on the lowermost end of the pipe 12. The annular orifice 14 has a thin slit (not shown) through which an annular stream of molten glass flows. As the annular stream of glass flows through the orifice 14 it forms a tubular structure generally indicated by the reference number 16 in FIG. 1. The tube 16 of glass is flattened transversely before it completely solidifies forming two opposed walls 17 which are led between a pair of feeding rollers 18. The rollers 18 apply attenuating traction to the tube 16 drawing it downwardly from the annular stream of glass.

Figures 1, 2, 3:
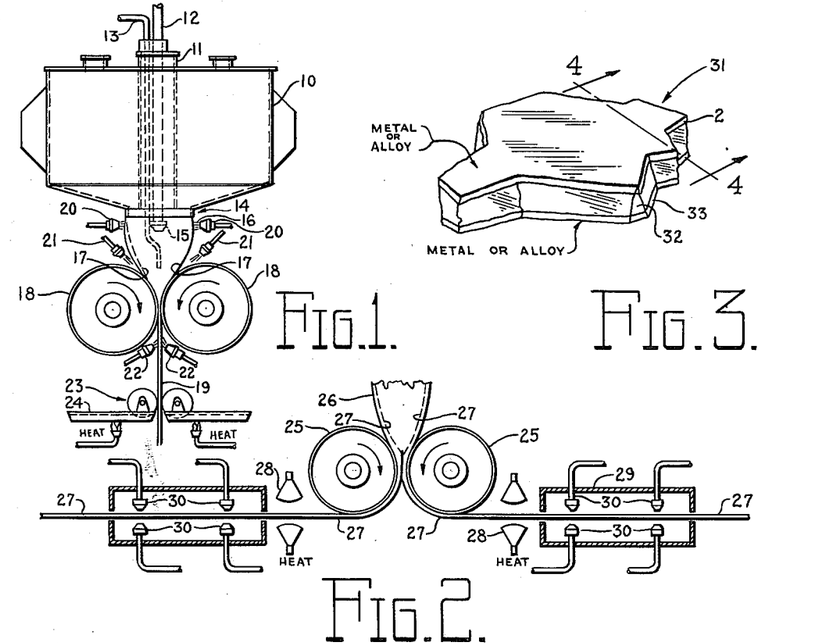
FIG. 1 is a diagrammatic view in elevation of film forming apparatus generally of the type shown in Slayter Patent No. 2,457,785 as employed according to the invention for the production of glass film or flakes that are combinations of glass with metals or compositions containing metals.
FIG. 2 is a fragmentary diagrammatic view in elevation of a modified form of apparatus for practicing the instant invention.
FIG. 3 is a greatly enlarged view in perspective of one form of glass flake or platelet that is produced and utilized according to the invention.

In order to prevent inward collapse of the tube 16 from its own surface tension and the attenuating tension, and thus surface contact between the walls 17, which in their softened state would adhere to each other at a level above the bite between the pulling rollers 18, gas or vapor is pumped into the interior of the tube 16 through one or the other of the pipes 12 or 13 under sufficient pressure to slightly balloon the tube 16.

After the tube 16 passes between the rollers 18 it is collapsed to form a double walled ribbon generally indicated at 19 which may be led away for subsequent treatment or which may be broken up to form individual flakes or platelets of glass.

According to the instant invention the apparatus of FIG. 1 may also be provided with two or more spray heads for the application of surface treating or coating substances to the exterior of the tube 16 and thus to the exterior of the double ribbon 19.

These spray heads or nozzles may be located at the positions shown in FIG. 1 which are occupied by the spray heads 20, just below the orifice 14; the spray heads 21, directed into the nip between the converging exterior surface of the walls 17 and the surfaces of the rollers 18; or the spray heads 22, beneath the rollers 18 and on opposite sides of the double ribbon 19. If desired, either in addition to one or more pairs of spray heads 20, 21 and 22 or alternatively thereto, a pair of roll applicators generally indicated at 23 may be employed for the transferral of surface treating or coating substances from heated pans 24 to the exterior walls of the double ribbon of glass 19.

The incorporation of the glass flakes or the continuous glass film into a metallic composition may be facilitated in some instances by the application of a layer or coating of metal or a composition containing metal on one or both surfaces of the glass at the time of formation of the double ribbon 19. Coating of the interior surfaces may be accomplished on the apparatus of FIG. 1 in numbers of different ways. For example, the metal to be deposited upon the inner surface of the glass film may be vaporized into an inert gas and the mixed gas pumped through the pipe 12 under pressure. Such metallic vapor would function both for the purpose of "ballooning" the tube 16 and for the deposition of the metal forming the vapor on the inner surface of the walls 17. If the quantity of vapor necessary to properly coat the surfaces is greater than that needed to balloon the tube 16, the pipe 13 may be used as a return line to keep the pressure in the tube 16 constant.

Similarly, if a composite coating is desired, one metal or composition containing metal in vaporous form is pumped through the pipe 12 and another metallic vapor may be introduced through the secondary pipe 13. It will be appreciated that the actual pressure required to maintain the balloon in the tube 16 is low, so pressure balance is delicate and must be maintained carefully.

As an illustration of the pressure balance problem, if lead tetraethyl is introduced into the tube 16 its thermal decomposition produces approximately four mols of ethylene and two mols of hydrogen for each mol of lead tetraethyl introduced and thus each mol of lead deposited on the walls of the tube 16. In such case, one of the pipes 12 or 13 would be employed as an exhaust line to remove the excessive waste gases. This may be economically wasteful but is feasible for certain purposes.

It is also possible to introduce the metallic composition with which the flakes are to be associated in the liquid phase as, for example, by pumping or pouring it down one of the pipes 12 or 13 and utilizing the other one of the pipes 12 or 13 for a return line or for a pressure line to introduce the gas necessary for ballooning out the tube 16. Under some circumstances it might be desirable to introduce vaporous or liquid metal through one of the pipes 12 or 13 and a fluid reactive therewith through the other pipe 12 or 13 to cause reaction of the compounds and their deposition upon or adherence to the inner walls of the tube 16. Various combinations of compounds which may thus be added interiorly of the tube 16 will be discussed below. Of course, either or both of the pipes 12 or 13 may be equipped with spray heads such as the spray head 15 if it is desired to spray the liquid metal onto the surface of the tube 16 rather than merely pour the metal into the bite between the walls 17 at the rollers 18.

It should be noted that where the coating material is introduced as a liquid or as a vapor which condenses or forms a deposit, a sufficient thickness should be deposited on the surface of the walls 17 so that as the glass is attenuated, the coating will spread over the increasing area of the glass. This may limit the types of metals which can be deposited in a continuous layer on the glass to those which remain at least plastic at the temperature of the glass while it is attenuated. Introduction of such metals or compositions at rates sufficient to maintain a small pool in the bite between the converging walls 17 of the tube 16 when possible, simplifies the provision of metal at the area of attenuation.

Metal or metallic alloys or compositions may also be introduced into the interior of the tube of glass 16 in powdered form. The powder may be delivered through either of the pipes 12 or 13 or both, i.e., it may be introduced with a gas to inflate the tube 16 or it may be separately fed.

In some cases, it may be advantageous to spray the powdered metal in a suitable carrier into the interior of the tube 16. A fugitive wax carrier which would be vaporized by the heat in the interior of the tube 16, could be employed, being sprayed from the spray 15, for example, and the vaporized wax removed through the pipe 13. Other carriers such as heavy oils may similarly be employed. Combinations of a high melting point powdered metal or composition containing metal in a liquid metal or composition as a carrier may be employed. In this case the tube 16 is coated with a layer of one metal or composition in which another powdered metal or composition is retained in that form. Subsequent treatment, as by heat and pressure, may be employed to modify the physical relationships of the glass and metals or compositions.

Figure 17:
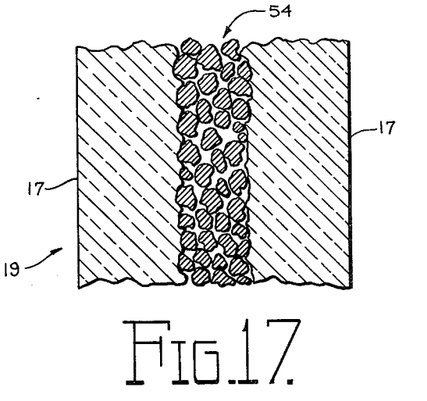
FIG. 17 is a fragmentary vertical sectional view on a greatly enlarged scale of glass film combined with powdered metal during the production thereof.
Figure 18:
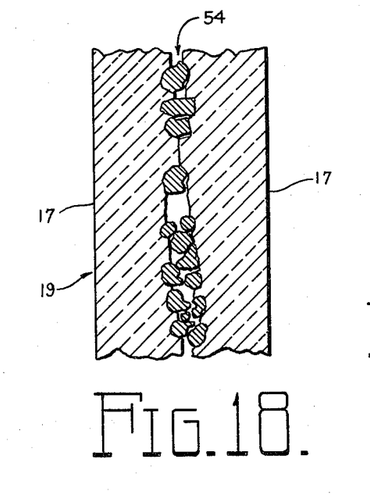
FIG. 18 is a view similar to FIG. 17 but illustrating a combination of a lesser proportion of powdered metal with glass film.

It will be appreciated that if a metal or composition containing metal in powdered form is employed, the metal or composition may be one that is liquid at the temperature encountered, in which case its use in powdered form may be dictated by operative determinations, or it may be one that does not liquefy at such temperature. In this latter case, the powdered metal or composition would remain in that form, being merely deposited upon the glass film or accumulated between the layers 17 of the double ribbon 19. FIGS. 17 and 18 of the drawings illustrate such possibilities and will be described in detail below.

Some metals, for example, zinc or alloys having low melting points may be introduced into the tube 16 in the form of rods that are fed down the tube 13 and melted by the heat of the glass at the nip between the walls 17 so that the metal drips down.

While the utilization of metals or compositions containing metals in powdered form is within the invention and dictated in many instances by the characteristics of the metal or its subsequent treatment, if the final glass and metal combination produced according to the invention is to be utilized in the form of discrete particles, say small flakes or powder, pre-grinding of the metal may be obviated by utilizing the metal in liquid or gaseous form for the coating step and then pulverizing, grinding or breaking up the finished glass-metal material.

The exterior of the tube 16 or the flattened ribbon 19 may be coated or otherwise treated or subjected to treatment by a metallic composition in the vapor or liquid phase by spraying such composition from the spray heads 20, 21 or 22 directly onto the exterior of the glass tube 16 or the ribbon 19.

If it is desired to apply the coating or surface treating material to the exterior of the tube 16 while the glass has a higher temperature or before there is an opportunity for moisture to be adsorbed on its surface, the material may be sprayed through the spray heads 20. If it is preferable to spray the material onto a cooler surface it may be sprayed through the spray heads 21. If it is desired that the material be sprayed on a completely cool exterior surface then it may be sprayed through the sprays 22 onto the exterior of the cooled and attenuated double ribbon 19. Some materials adapt themselves particularly well to roller transfer in which case the exterior coating of the double ribbon 19 may be applied thereto by the roll applicators 23. It will be understood, of course, that the sprays 20, 21 and 22 and the roll applicator 23 may be used either singly or in various combinations for the applications of single coating materials or combinations of coating materials.

The utilization of more than one different coating material, for example, in order to produce an intermetallic compound or a mixed composition of the coating materials, may be carried out both on the interior and exterior of the tube 16 and double ribbon 19 or the opposite surfaces of the glass may be differently treated.

Uniform coating of the exterior of the tube 16 or double ribbon 19 by a suitable metal in gaseous phase or by a decomposable metal compound vapor may be accomplished by enclosing the pulling wheels 18 and double ribbon 19 in an enclosure (not shown) and maintaining an atmosphere of the gaseous composition throughout the enclosure, preferably under negative pressure. Likewise, the entire tank 10 and pulling rollers 18 may advantageously be enclosed in such an atmosphere. This expedient eliminates the possibility of contamination of the exterior surfaces of the tube 16 or double ribbon 19 during their formation and prior to the deposition of coating metal or composition containing metal thereon.

The particular points of application of the coating and the manner of its application, i.e., the sprays 20, 21 or 22, roll applicator 23 or enclosure containing a suitable atmosphere, are determined not only by the nature of the compositions being combined with the glass but also by the nature of the glass itself from the standpoints of adhesion, interdiffusion, coupling or other mechanism to be discussed in detail below by which the metal or metallic composition is combined with the glass flakes or film according to the invention.

In FIG. 2 there is shown a pair of pulling rollers 25 similar to the pulling rollers 18 of FIG. 1 and a fragmentary portion of a tube 26 formed as illustrated in FIG. 1. The tube 26 is flattened by the rollers 25 to provide opposing walls 27. It will be observed in FIG. 2 that the axes of the pulling rollers 25 are spaced from each other a distance slightly greater than the distance in FIG. 1. The opposed walls 27, therefore, do not engage each other in the nip between the rollers 25. By suitable time and temperature control the opposed walls 27 are caused to split, crack or viscously pull apart at their edges so that the two walls 27 can be diverged one from the other as they depart from between the rolls 25 to form separate continuous films of glass. Each of the films 27 in the apparatus of FIG. 2 is led through a heating zone (illustrated by heat lamps 28) where, if desired, the glass may be re-softened. Each of the films 27 is then led through a treating enclosure 29 where sets of sprays generally indicated at 30 are provided for spraying surface coating materials onto the films 27. In the utilization of the apparatus of FIG. 2 it is not necessary to employ the pipes 12 or 13 as in FIG. 1 because the coating substances whether gaseous, liquid or powdered, can be emplaced on the films 27 in the enclosures 29. While heat lamps 28 are shown as heat sources, ovens or flames or other heating means of greater or lesser intensity and extending over a greater or lesser area may be substituted for the lamps 28.

FIGS. 3–15 and 23 are diagrammatic in nature and do not indicate the relative proportions of metal to glass. In some cases there would be more glass than metal and, in others, there would be more metal than glass. The figures also are simplified and show the glass flakes generally aligned. In practice, however, such alignment will depend upon the processing and mixing conditions and the flakes will not necessarily be aligned as a result of the first processing steps.

Figure 4:
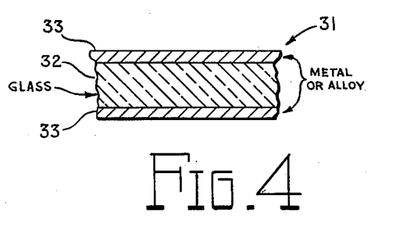
FIG. 4 is a fragmentary vertical sectional view on a further enlarged scale taken along the line 4—4 of FIG. 3.

FIG. 3 is a view in perspective of a metal coated glass flake generally indicated at 31 as produced according to the invention and comprising a glass flake 32 having metal coatings 33 on both of its faces. FIG. 4 is a vertical sectional view of the flake 31. The flake 31 is produced by breaking up the coated film 27 of FIG. 2 or one side of the coated double ribbon 19 of FIG. 1.

It will be appreciated that a final glass metallic composition may be directly fabricated by merely assembling a mass of the flakes 31 in a mold, for example, and heating the mass, generally under pressure, until the metal constituting the coatings 33 on all of the flakes fuses together to form a metallic matrix around the glass flakes. An illustrative arrangement is shown in section in FIGS. 7 and 8 where glass flakes 34 and 35 appear throughout a mass 36 of metal. The particular flake numbered 35 in FIGS. 7 and 8 lies just below the plane of FIG. 8 and illustrates how the flakes overlap each other; the flakes 34 lying, in part, at least, behind the flake 35.

Figure 7:
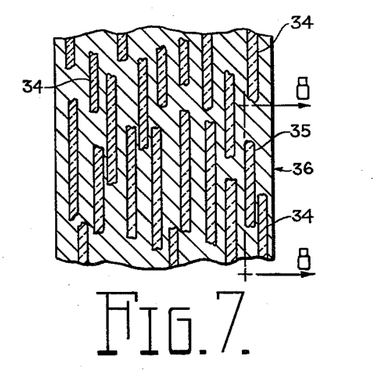
FIG. 7 is a transverse sectional view of a glass and metal material produced according to the invention.
Figure 8:
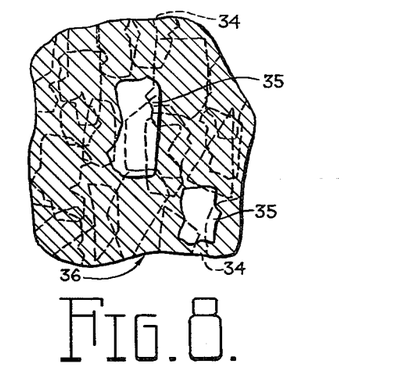
FIG. 8 is a fragmentary vertical sectional view taken along the line 8—8 of FIG. 7.

Although, in FIGS. 7 and 8, the mass 36 of metal is shown as being similar throughout, it will be appreciated that it may be desirable in some instances to first coat the flakes 32 (FIG. 3) with a thin layer of one metal and to then utilize the metal coated flakes 31 in composition with a different metal. Such a process would be feasible and desirable where the metal from which the mass is to be formed does not bond well to glass and where the glass is, therefore, first coated with a compatible metal or one with which it will bond, say by interdispersion between the faces of the glass and the first metal, and then embodied in a finished composition with another metal. For example, a lead glass might be first coated with lead, then employed in combination with aluminum. The aluminum may or may not be carried upon the glass flakes. The flakes may carry both a lead and an aluminum coating or a lead coated flake may be added to molten or powdered aluminum prior to the formation of a metal shape, mass, or article.

Figure 5:
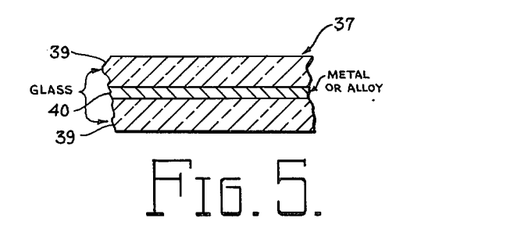
FIG. 5 is a fragmentary vertical sectional view similar to FIG. 4 but showing a different type of flake or platelet produced according to the invention.
Figure 6:
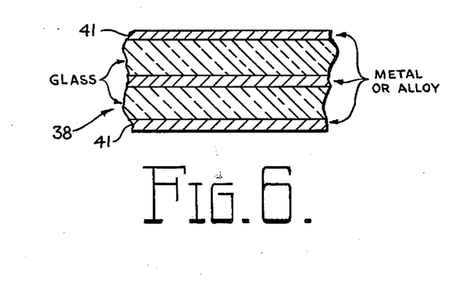
FIG. 6 is a view similar to FIGS. 4 and 5 but of a still different type of flake or platelet according to the invention.

It is not necessary that the metallic portion of every composition be combined with or deposited upon the glass film at the time of its fabrication although this is very effective with respect to certain compositions and certain end uses of the flakes. Additionally, it is not necessary that the metal or metallic composition applied to the inner surfaces of the glass as formed shall be identical with the metal or metallic composition applied to the outer surface. For example, it might be desirous to weld or adhere the inner surfaces of the two sides of the double ribbon 19 to each other to form a laminated flake 37, as shown in FIG. 5. Such adhesion might be accomplished by introducing a suitable metallic composition, metal, or metal salt into the interior of the tube 16 in a vaporous, powdered or molten condition as by maintaining a pool of liquefied metal at the bottom of the tube 16 where it enters the nip between the rollers 18. The metal or metallic composition thus used might be employed in this instance as a laminating medium, i.e., one intended either solely or additionally for holding the two flakes of glass together to make a laminated flake. The exterior of the tube 16 might or might not be surface treated. If it is surface treated the surface treatment might be the same metal as that employed to laminate the flakes or film, or it might be a different metal. Such a laminated flake having an exterior coating of metal or composition containing metal is illustrated in FIG. 6 and generally indicated by the reference number 38. The flake 37 of FIG. 5 has two glass layers 39 and an innermost layer 40 of metal, metal alloy or composition containing metal. To this structure there is added, in the case of the flake 38 of FIG. 6, a pair of outer layers 41 of metal, alloy, or composition containing metal, as desired.

Whether or not the metal or metallic composition introduced into the interior of the tube 16 will stick the two sides of the double ribbon 19 one to the other depends not only upon the particular metal or metallic composition employed but also upon the spacing between the axes of the rollers 18 and upon the pressure with which the fluid is introduced into the interior of the tube 16 to keep it from collapsing. If these factors are properly adjusted then the two opposed walls 17 of the tube 16 may be spaced from each other in the double ribbon 19. The spacing may be produced only by the metallic interior layer 40 of the laminated flake 37 or 38 or the spacing may be greater than the thickness of the interior surfacing material so that two separate walls 17 each having the coating of metal or metallic composition may be found in the ribbon 19. In this instance the flakes formed from each of the two walls 17 would appear in section as shown in FIG. 4.

It may be desirable in some instances to coat the interior surfaces of the tube 16 with a non-metal and to apply a metal or metallic coating to its exterior or vice versa or to apply a second non-metallic coat over a metallic composition. The possibilities of applying various compositions are broad because of the many points of application, i.e., the interior of the tube 16, its exterior above the pulling wheels 18 or the exterior of the double ribbon 19 at a point below the pulling wheels 18, or, where the ribbon 19 is split to form separated films 27 as in FIG. 2, both sides of the films 27 simultaneously. In this latter instance, of course, flakes or film produced on the apparatus of FIG. 2 in cross section would be substantially identical to the glass flake 31 of FIG. 4, i.e., they would have an inner layer of glass with a surface coating of metal or composition containing metal on each side.

In addition to the combinations of the glass flake and metals or metallic compositions during the fabrication of the glass flake as discussed above, the present invention contemplates the introduction of finished glass flake with or without surface treating, lubricating, dispersing, adhering or coupling agents into masses of molten metal or metal alloys for the fabrication of reinforced metallic compositions. In common with the combining of other materials, problems of mechanical mixture, dispersion, orientation, adhesion, etc., are encountered here. If the admixture is to be produced by mere mechanical mixing then preferably the mixing should take place in some manner which subjects the glass flakes to as little mechanical damage, i.e., impact, as possible. The mixing action should, therefore, be a kneading action rather than a violent stirring action.

The problems of bonding between either the glass and a thin layer applied to it during manufacture, or between the glass and a matrix of metal into which the flakes are admixed, may be considerable. For this reason it is sometimes desirable to reverse the processes explained above and to first coat the surfaces of the glass flake with a surface active agent so that the metal will adhere to it. Such an agent might, in fact, be a metallic oxide, a metal salt, or other material which could be present as a distinct coating layer or, under proper conditions, could make an interdispersion bond to the glass itself. Having achieved this bond, then subsequent treatment might bring about an alloying or interdispersion or other bonding between the surface layer and the matrix of the metal. A more complete explanation of this type of bonding will be found below where specific examples of glass compositions and metals suitable for such compositions will be found.

After the mass of material has been formed, i.e., cast, molded, or otherwise produced, it may be impossible to determine whether or not the material was produced from metal coated glass flakes, for example, the flakes 31 of FIGS. 3 and 4, laminated glass flakes such as the flakes 37 of FIG. 5, or coated laminated flakes 38 of FIG. 6, or whether the finished mass was produced by incorporating uncoated glass flakes into or with metal or a composition containing metal. If the coating on the surface of the flakes is the same as the remaining portion of the metal matrix then the two would blend one with the other and become indistinguishable. If the metal coating on the surface of the flakes is a metal or a composition containing metal which will alloy with the remaining metal the two metals or compositions would be alloyed in the area immediately surrounding each of the reinforcing or bulking flakes. In both of these instances the cross sections of FIGS. 7 and 8 are depictions of the resulting composition.

Figure 14:
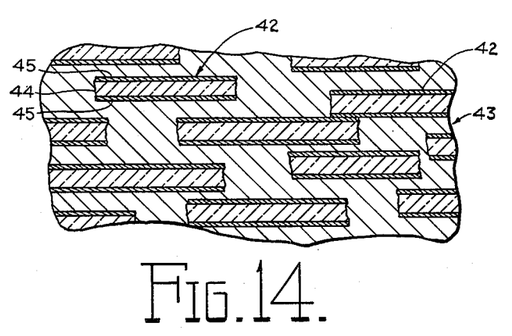
FIG. 14 is a fragmentary vertical sectional view through a material incorporating coated glass flakes where the coating and the material constituting the matrix are not the same and where the flakes may, in themselves, constitute a material produced according to the invention.

FIG. 14 illustrates a material that is produced where the film or flakes are coated at the time of fabrication as discussed above with respect to FIGS. 1–6 and then these metal and glass compositions are added to a subsequent composition according to the invention, and the metal, metal oxide or other coating is non-alloying or non-miscible with the subsequent composition. Glass flakes generally indicated at 42 are shown as extending through the mass 43. Each of the flakes 42 comprises an inner glass flake or platelet 44 and surface coatings 45 adhered to the platelet 44 according to the invention. The mass 43 may be a metal which will not alloy with the metal of which the coatings 45 are comprised, or it may be a non-metal. In reverse, the coatings 45 on the surface of the flakes 44 may be a non-metallic material placed thereon, for example, by spraying through the spray heads 21, to facilitate subsequent bonding between the glass 44 and a metallic mass 43. For example, the coatings 45 might be oxides of metals. In the structure of FIG. 14 many variations are possible. The coating layers 45 may consist of metals, metal alloys, compositions containing metal, oxides of metals, other metallic compounds such as chlorides, sulfides, etc., or materials other than those just listed which are added to the flakes 44 for purposes of facilitating bonding, admixture, etc. The mass 43 may consist of a metal or composition containing metal different from the layers 45 if they are metallic. It may consist of a metal or composition containing metal bonded to the glass flakes 44 by assistance from a non-metallic coating 45 or it may consist of a composition (which is neither a metal nor a composition containing metal such as a cementitious or resinous mass) bulked up or reinforced by glass flakes 44 having metallic coatings 45. In any of these instances the glass flakes 44 and coatings 45 or the glass flakes 44 and the mass 43 constitute a material produced according to the invention comprising glass and a metal or a composition containing metal.

While the mass illustrated in FIG. 14 employs glass flakes 42 having exterior coatings 45, it will be appreciated that the mass 43 may be similarly reinforced or otherwise modified by the utilization of glass flakes 37 as in FIG. 5 or glass flakes 38 as in FIG. 6. In these latter two cases the metal layers 40 or 41 may or may not be identical with the material of which the mass 43 of FIG. 14 is comprised.

Because of the considerable disparity between the specific gravities of the glass flakes and the masses of metal into which they are to be mixed, mechanical admixture of the flakes to metal may be facilitated by coating the flakes at the time of manufacture, as explained above, with a thin layer of the same metal or a compatible metal, or by utilizing the laminated flakes 37 of FIG. 5. By laminating the flakes as in FIG. 5 a considerable quantity of metal can be placed in the laminated flake 37 thereby making its specific gravity closer to that of the metal to which it is to be admixed. During mechanical mixing under these conditions there is less tendency for the flakes to drift to one or the other surfaces of the molten metal. If the metal thus added is one which does not melt or alloy to the matrix, it will stay on the flakes. If the matrix is a material of other metals or other than a metal, say even a cementitious material or a resinous material, the metal may both provide a bonding agent and the apparent density desired.

Figure 9:
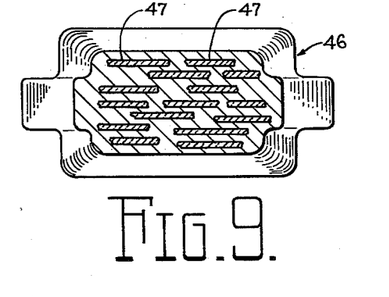
FIG. 9 is a vertical cross sectional view through a forging blank fabricated from a metallic composition according to the invention.
Figure 10:
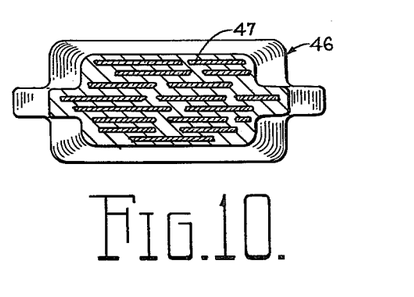
FIG. 10 is a view similar to FIG. 9 but showing the forging blank during or after the forging operation.
Figure 11:
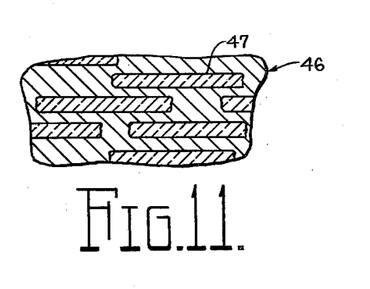
FIG. 11 is a fragmentary sectional view on an enlarged scale of a portion of the forging blank shown in FIG. 9.
Figure 12:
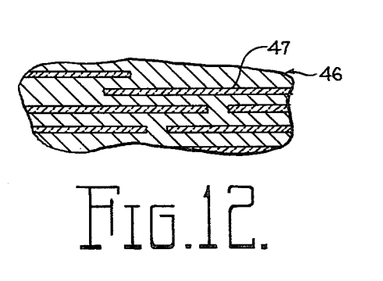
FIG. 12 is a view similar to FIG. 11 but of a portion of the forging blank as shown in FIG. 10.

An interesting phenomenon is illustrated in FIGS. 9–12, inclusive, wherein a mass of metal generally indicated at 46 is cast in a rough blank shape suitable for forging. The mass of metal 46 is heated to a forging temperature. Glass flakes 47 dispersed through the mass of metal 46 are, in this instance, fabricated from glass tailored to soften at the forging temperature of the particular metal. As can be seen in FIGS. 9 and 11, before the forging operation occurs each of the flakes 47 has considerable thickness. After the mass of metal 46 is heated and subjected to forging action the mass 46 may resemble the outline shown in FIG. 10 where it will be observed that its thickness has been decreased and its width slightly increased by the flowing of the metal induced by the repeated forging blows. Similarly, because the flakes 47 have been softened or fused by reason of the forging temperature, the flow of metal and the decrease in thickness of the metal mass 46, causes the flakes 47 to become thinner and more elongated. This further increases the extent of their alignment, overlapping and strengthening powers within the forged mass of metal 46.

The elongation of flakes 47 has the additional feature that it provides nascent glass surfaces during a time when both metal 46 and the glass flakes 47 are at a temperature such that the two may bond to each other. Because the flakes 47 are completely embedded within the metal mass 46 the nascent surfaces produced by the elongation of the flakes 47 are not subject to any contamination as by the adsorption of moisture or other ambient materials so that conditions are most suitable for adhesion between the two.

Figure 13:
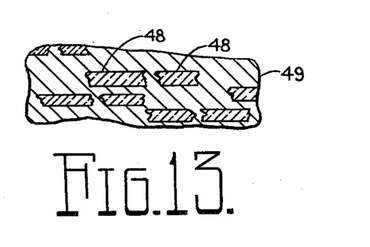
FIG. 13 is a view similar to FIGS. 11 and 12 but of a fragmentary portion of another forging blank treated in a slightly different manner and illustrating a different result.

FIG. 13 illustrates a different phenomenon in which a plurality of glass flakes 48 are distributed throughout a mass 49. In this case the forging temperature and the nature of the glass from which the flakes are fabricated are such that the flakes 48 do not soften appreciably and thus cannot flow under the forgoing blows. The force of the blows is, therefore, absorbed by shattering the flakes 48, to the form shown. In this case the flakes 48 would not be appreciably thinner than they were at the time of initial forming of the mass 49 (compare with FIG. 11).

Figure 15:
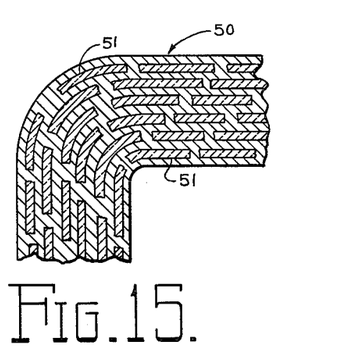
FIG. 15 is a fragmentary sectional view through a forged glass and metal composition produced according to the invention.

FIG. 15 illustrates how, in the forging of a metallic mass generally indicated at 50 which is reinforced by a plurality of glass flakes 51 according to the invention, the glass flakes 51 flow along the line of movement of the metal 50. In other words, when a mass of reinforced metal fabricated according to the invention is bent at forging temperature the glass flakes 51 are softened and bend with the metal so that they extend parallelly to the surfaces of the metal 50.

The present invention contemplates not only the fabrication of materials comprising glass in flake or film form and metals or compositions containing metals but also the fabrication of materials comprising glass and metals or compositions containing metals in particulate form. As was explained above the metal may be introduced in particulate form and it may be fused during fabrication of the glass film, becoming, with respect to the glass film, the same as a metal or composition containing metal that is introduced in liquid or vapor form. However, metals which do not fuse at the temperatures encountered in the fabrication of glass film or flake may also be combined with glass in flake or film form or with a glass matrix according to the invention.

Figure 16:
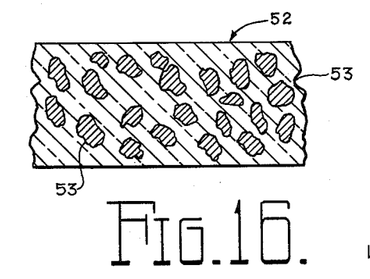
FIG. 16 is a fragmentary vertical sectional view of a glass and metal composition illustrating the utilization of metal in powdered form in a glass mass according to the invention.

FIG. 16 illustrates a mass of glass generally indicated at 52 throughout which granules 53 of metal or composition containing metal are dispersed. The material illustrated in FIG. 16 may be produced from several forms of preliminary product produced according to the invention. FIG. 17 is a greatly enlarged vertical sectional view through the double ribbon 19 of FIG. 1 showing the two walls 17 of the double ribbon 19 and between them a considerable quantity of metallic particles generally indicated at 54.

FIG. 18 is a view identical with FIG. 17 except that a lesser quantity of metallic particles generally indicated at 54 is shown as located between the inner surfaces of the two walls 17 of the double ribbon 19 of glass. It will be observed in both FIGS. 17 and 18 that some of the particles 54 of metal may be embossed into and adhered to the surfaces of the glass by reason of its being soft at the time the powder or granules are deposited therein by the apparatus of FIG. 1.

The double ribbon 19 with the entrapped granules 54 may be subjected to additional heat and pressure so as to at least partly fuse the walls 17 of the ribbon 19. This results in producing a continuous film or flake generally indicated at 55 in FIG. 19 where the glass has flowed into the interstices between the granules 54.

Figure 19:
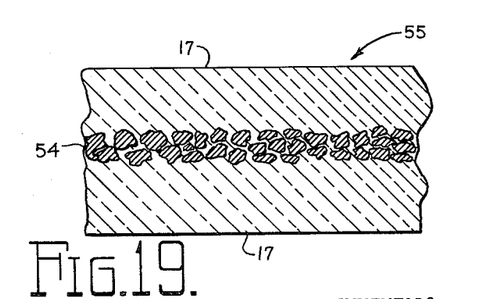
FIG. 19 is a view similar to FIGS. 17 and 18 but illustrating the material after a subsequent glass fusing step, a flake or section of a film being shown.

For some applications as, for example, where a mass is to be molded or cast from galss and metal, the fusing step just discussed may not be necessary and the double ribbon 19 may be broken into fragments (like the fragmentary portions thereof illustrated in FIGS. 17 and 18) and the fragments consisting of glass and metal or compositions containing metal in the form of particles, handled as an intimate, particulate admixture. In other cases the production of the fused, unitary, composite flakes 55 of FIG. 19 is advantageous and, in fact, the flakes 55 of FIG. 19 can be employed in all applications for flakes embodying the invention which have been discussed above with respect to composite flakes produced by coating glass with metal in liquid, gaseous or fusible powder form. The flake 55 of FIG. 19 is identical in many of its characteristics with the flake 37 of FIG. 5, for example, saving only the intermediate metal layer 40 of FIG. 5 is continuous while the intermediate metal layer represented by the granules 54 of FIG. 19 is discontinuous.

The structures of FIGS. 17–19, inclusive, have one phase of flexibility not present in the earlier flake forms because they represent a manner in which a composite metal and glass flake can be produced incorporating a metal which cannot be fused at the temperatures encountered in the apparatus of FIG. 1 or in similar apparatus upon which the glass flakes can be produced.

For some purposes it may be desirable that the particles 54 in FIGS. 17–19 be made up of two or more metals or a metal and another material such as a metal compound like tin chloride or a lower melting glass such as a lead glass or a fluorine containing glass.

Figure 20:
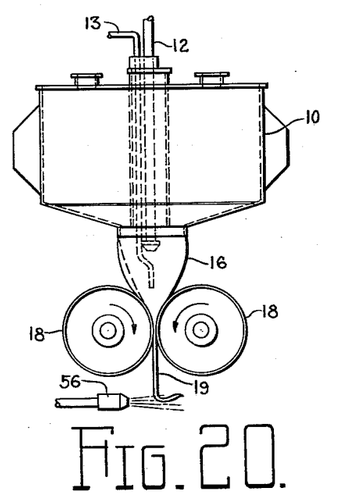
FIG. 20 is a view similar to FIG. 1 and including an illustration of a subsequent fabrication step.

FIG. 20 illustrates the apparatus of FIG. 1 as it is combined with additional apparatus for the high speed production of particulate structures comprising glass and metal according to the invention. In FIG. 20 after the double ribbon 19 departs from between the pulling rollers 18 it is fed into the blast from a burner 56. The double ribbon 19 of FIG. 20 may be a double ribbon existing in any of the forms previously discussed or it may be a double ribbon precisely as shown in FIGS. 17, 18 or 19. The high velocity of the blast from the burner 56 shreds the ribbon 19. Depending upon the temperature and velocity of the blast from the burner 56, the ribbon 19 may be broken into globules, such as the globule 57 of FIG. 21, wherein the glass indicated at 58 is molten and its surface tension constricts it into a sphere and the particles 54 are distributed generally in an oval mass more or less at the center of the globule 57. If the velocity and temperature of the blast from the burner 56 are higher then the blast shreds the ribbon 19 out into elongated fiber-like portions such as the fiber 59 shown in FIG. 22. In such case the glass phase indicated at 60 is generally cylindrical in configuration and the metallic particles 54 are distributed more or less generally throughout the glass 60.

Figure 21:
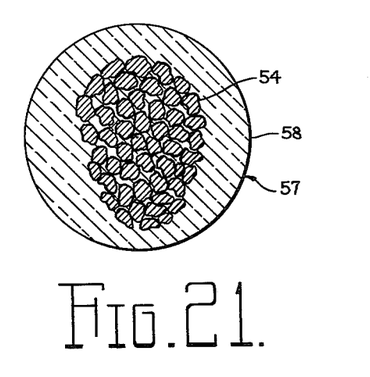
FIG. 21 is a vertical sectional view on a greatly enlarged scale of a glass and metal globule produced according to the invention on the apparatus illustrated in FIG. 20.
Figure 22:
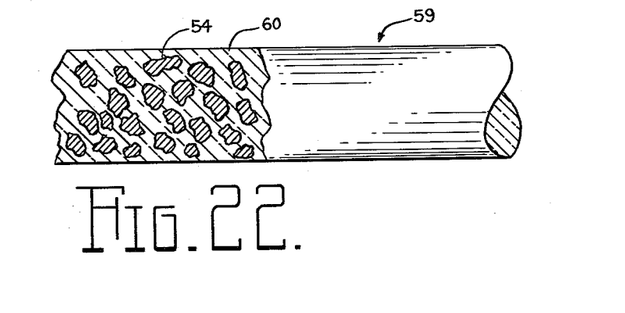
FIG. 22 is a fragmentary view, partly in section and partly in elevation, of a glass and metal composition in fibrous form as produced on the apparatus of FIG. 20 according to the invention.

By such additional treatment with a blast burner, the various forms of first product such as those shown in FIGS. 3–6 and FIGS. 16–19 may be converted to other products generally similar to FIGS. 21 and 22 but of inverse arrangement. Depending upon the particular glass compositions and metals employed and the relative amounts of each, globular and fibrous forms may be produced in which the glass is dispersed in a continuous exterior phase of metal and metal oxides.

The double ribbon 19 comprising the films 17 with metal particles 54 located between the films 17 as shown in FIGS. 17 and 18 when broken into flakes, such as the flake 55 of FIG. 19, can be used to produce, by fusion techniques, or by sintering techniques, bodies which are either metallic particles 53 embedded in a glass matrix as shown in FIG. 16, or glass flakes embedded in a metal matrix as shown in FIG. 7.

The glass globules 57 (FIG. 21) or broken up glass fibers 59 (FIG. 22) each with the metal particles 54 embedded therein, can also be used in combination with or in place of the several types of flakes produced from the double ribbon 19 of FIGS. 17 and 18 (i.e., the flake 55 of FIG. 19 or flakes having the appearances of the sections of the ribbon 19 shown in FIGS. 17 and 18). All of these several forms of combinations of glass and metallic particles are substantially identical when employed in fusion or sintering techniques.

The type of body that is formed by sintering or fusion techniques depends upon the relative proportions of glass and metal powder employed, the variance between the softening and sintering or fusion temperatures of the glass and metal particles, respectively, and also upon the relative fineness of glass particles and metal particles.

As a specific example of the possible use of glass with metal embedded therein in the powder metallurgical field, bodies can be produced from such combinations where the metal is appreciably more refractory than the glass, for example, nickel powder, iron, cobalt, molybdenum, tungsten, or other refractory metal powder, and the glass is present in substantial proportions, e.g., from about 20 percent to about 80 percent. By compressing a body of such material into a desired shape and then heating above the softening temperature of the glass, either under continuing pressure, or without the application of pressure during the heating step, bodies can be produced which are made up of a continuous glass phase with discrete particles dispersed therein. In most instances, the discrete particles of metal are substantially insulated from one another by thin layers of glass. By increasing the proportion of glass to metal in such a structure, solid bodies can be produced which vary, for example, in magnetic properties and electric conductivity, as a function of glass concentration. Such bodies are relatively brittle, having, in general, the characteristics of the glass which forms the matrix or continuing phase.

In other instances, where the metal particles have a sintering or fusing temperature appreciably below the softening temperature of the glass, and where the metal is present in a substantial portion, for example, between about 20 percent and about 80 percent, bodies can be pressed and heated, as described, to a temperature either above the sintering temperature or above the fusion temperature of the metal, but below the softening temperature of the glass. In such instance, the discrete metal particles are either sintered together, or fused together, to form the body 36 shown in FIG. 7, where the metal is the continuing phase, and the glass particles are dispersed therein. Examples of metal powders that can be incorporated interiorly of the double ribbon 17, and used to produce a unitary structure of this type include aluminum, magnesium, Wood's metal, lead, and the like.

When the softening temperature of the glass and the fusion or sintering temperature of the metal are substantially the same, still a different type of structure can be produced. Such different structure is one wherein discrete glass flakes tend to coalesce, and discrete metal particles also tend to coalesce, and inter-diffusion, as hereinafter described, between the metal particles and the glass particles proceeds to a substantial extent. In order to produce such a structure it is essential that the specific gravity of the metal and the effective specific gravity of the glass flakes be substantially the same. This can be accomplished, for example, by embedding interiorly of the double ribbon 17 a uniform admixture of a high melting or refractory metal with a second metal having a sintering or fusion temperature approximately equal to the softening temperature of the glass. When the lower melting metal is fused, and the glass softened, during the heating step, the high melting or refractory metal remains solid, and adhered to the glass. By appropriate proportioning between the refractory metal and the lower melting point metal, the glass flakes can be caused to have approximately the same effective specific gravity as the lower melting metal, and to remain dispersed in the metal during the heating.

Figure 23:
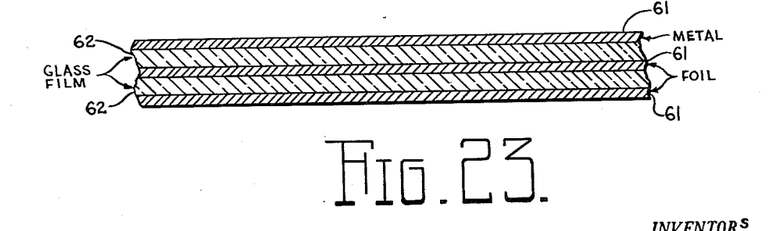
FIG. 23 is a fragmentary vertical sectional view of a laminated film-like material comprising glass and metal according to the invention.

FIG. 23 illustrates a linear structure comprising alternate layers of metal foil 61 and glass film 62. Such a continuous laminate is produced on the apparatus of FIG. 1 by operating it continuously and by not breaking up the produced material as would be done if the flakes 38 of FIG. 6 were to be the immediately produced product. The laminate of FIG. 23 may in itself be an end product or it may be merely an intermediate form in which a composition embodying the invention is shipped from the point of fabrication to the point of final use of combination flakes of the type illustrated in FIG. 6.

The following theoretical explanation is presented solely for the purpose of further illustrating and disclosing the invention, and is in no way to be construed as a limitation thereon. The terms "percent" and "parts," are used herein and in the appended claims, refer to percent and parts by weight, unless otherwise indicated.

*Adhesion Between the Glass Flakes and the Metal*

Certain glasses are wet by some molten metals, and, as a consequence, when glass flakes thereof are admixed with a melt of the metal, and the resulting admixture allowed to solidify, the flakes adhere tightly to the metal. As specific examples, molten aluminum wets lead borate glasses, $B_2O_3$ glasses, sodium containing glasses, and lead borosilicate glasses. It has been observed experimentally that molten aluminum wets a lead borate glass containing about 85 percent of PbO, 10 percent of $B_2O_3$, and 5 percent of $SiO_2$. It has also been observed that molten aluminum wets a $B_2O_3$ glass containing about 60 percent of $B_2O_3$, 20 percent of $Na_2O$, 10 percent of CaO and 10 percent of $SiO_2$. It has further been observed that a high soda glass containing about 52.5 percent of $SiO_2$, 37.5 percent of $Na_2O$, and 10 percent of $B_2O_3$ is wet by molten aluminum. In addition, experimental evidence shows that molten aluminum wets lead borosilicate glasses containing from about 20 percent to about 30 percent of $SiO_2$, from about 10 percent to about 15 percent of $Na_2O$, from about 15 percent to about 20 percent of PbO, from about 5 percent to about 25 percent of $B_2O_3$, from about 4 percent to about 12 percent of ZnO, from about 2 percent to about 5 percent of CaO, from about 5 percent to about 10 percent of $Al_2O_3$ or cryolite ($Na_3AlF_6$), from about 5 percent to about percent of fluorine (added as $CaF_2$) and up to about 5 percent of BaO. When it is desired to incorporate glass flakes in a particular metal, flakes of a certain composition can be selected, such composition being one which is wet by the particular metal, and merely admixed with the melt. In some instances it is probable that interaction and interdiffusion between the molten metal and the glass flakes occurs, at least to a limited extent, with some of the glass components actually diffusing into the metal. Such interdiffusion may also involve dissolution between the glass and the metal. After the glass-metal admixture solidifies, so that interdiffusion ceases, or proceeds only at an insignificant rate, there are composition gradients around each flake from a metal phase, through a diffused phase, to a glass phase somewhere on the interior of the original flake. The boundary diffused phase may be considered to comprise two interdispersed gradient compositions, one being glass with metal dispersed or dissolved therein and the other being metal with glass components dispersed or dissolved therein. In the former part of the diffused phase the metal concentration gradually decreases to zero at the beginning of the glass phase, while in the latter part the concentration of glass components gradually decreases to zero at the beginning of the metal phase.

Thus in the case of lead borate and lead borosilicate glasses, it has been observed that PbO therein is reduced by molten aluminum, and that the metallic lead formed by such reduction diffuses into the aluminum, while aluminum diffuses into the surface of the glass. $SiO_2$ in glass is reduced at high temperatures by molten aluminum forming silicon and $Al_2O_3$ on the glass surface, and both of these materials supply surfaces which are wet easily by molten aluminum and provide a strong bond between the glass and the aluminum. The silicon and $Al_2O_3$ also diffuse into the aluminum, while aluminum and $Al_2O_3$ diffuse into the glass. In such cases, the rates of diffusion and oxide reduction to metals are functions of temperature.

The presence of lead, silver, copper or antimony compounds in the glass composition leads to reduction to these respective metals when contacted with molten metals which stand higher in the electromotive series. Thus, by reaction with the glass surface in such cases to give these metals and a metal oxide, excellent wetting and adhering to such glasses by the desired molten metals may be secured.

*Effect of Oxide Inclusions in the Melt, for Example, Aluminum Oxide*

It has been observed experimentally that an aluminum oxide "skin" on the surface of molten aluminum interferes with the wetting of glass by aluminum, particularly when the glass is in the form of fibers in a strand. Aluminum oxide is much higher melting than aluminum, and remains in the solid state on the surface of any aluminum melt. If the film or skin of aluminum oxide is unbroken it prevents wetting by the aluminum of any glass surface, fibrous or platelet. The film can be broken mechanically, as by penetration of a sharp instrument, or by agitation of the entire melt. The film can also be eliminated chemically, for example by addition of boric acid or lead borate thereto. The boric acid or lead borate forms a low melting glass with the aluminum oxide; this low melting glass rises to the surface of the melt, and can be left there as a protective layer. Glass flakes introduced into the molten aluminum are wet by this protective layer which is, in turn, wet by the aluminum to give masses such as FIG. 7. The presence of a small amount of metallic magnesium, as an alloying ingredient in an aluminum melt, has also been found to be advantageous in achieving adhesion between the aluminum and glass. The previously discussed benefit from small amounts of magnesium may in part be attributed to the formation of a less dense and adherent oxide on the surface of the molten metal.

*Bonding of Metals to Nascent Glass Surfaces*

It is known that water and other gases from the atmosphere are adsorbed on glass surfaces, and it is believed that such adsorption begins almost as soon as a glass surface is exposed to an atmosphere. The adsorption is probably a continuing phenomenon which proceeds toward an equilibrium condition where molecules of gas from the adsorbed layer pass into the atmosphere at the same rate that different molecules from the atmosphere pass into the adsorbed layer. Considering a glass surface with an adsorbed layer of gases in equilibrium with a surrounding atmosphere, it is thought that the composition and extent of the adsorbed layer will change in response, for example, to a change in the composition or temperature of the surrounding atmosphere. When a glass surface is formed from a melt, for example, by extruding a body of glass through an orifice, as above described, there is believed to be an infinitesimal period of time during which there are no adsorbed gases on such surface. Adsorption proceeds, however, even on a hot glass surface, at a substantial rate. As a result, even a little as a second after a glass surface is formed, there is probably a partial layer of adsorbed gases in contact therewith. As such surface cools, the adsorbed layer of gases is thought to increase in thickness, and to approach equilibrium, as above discussed.

It is known that the adsorbed layer of gases discussed above includes water, which is believed to react with siliceous components of a glass to produce silica gel, or some similar partially dehydrated form of silicic acid.

It has been observed experimentally that freshly prepared glass flakes or platelets of any given composition adhere better, when admixed with a molten metal, then flakes or platelets of identical composition that have been allowed to stand for an appreciable period of time. In the case of molten aluminum, for example, it will be apparent that any gas which might reasonably be expected to constitute a significant portion of such an adsorbed film is capable of reaction with the melt. As a consequence, it must be assumed that the adsorbed gases are not responsible for the poorer adhesion noted with "old" glass surfaces. It is believed, therefore, that the silica gel or other similar layer which forms on "old" glass surfaces must be responsible for the decreased adhesion.

In one aspect, therefore, the invention contemplates bonding molten metal to a nascent or fresh surface of glass flakes or platelets. In general, bonding to a nascent or fresh surface can be accomplished either by applying molten metal to the surface immediately after formation thereof, or by preventing or minimizing the deleterious effect of adsorbed gases until the metal is applied. The latter method will subsequently be discussed in detail. As an example of the former technique, flakes can be incorporated in a melt of metal, and mechanically agitated to cause fracture; even though the nascent surfaces formed by fracture in such manner are usually of the order of only a few microns in thickness, and, therefore, constitute only a minor portion of the entire surface of a flake, measurably improved adhesion can be achieved in this manner. Nascent or fresh surfaces can also be formed on glass flakes during the course of a forging, or rolling, or similar operation on the metal in which flakes have been incorporated. If such operation is carried out at a temperature above the softening temperature of the glass, the flakes are elongated and the deteriorated surfaces thereon become thinner, are ruptured, or both, with resulting increased adhesion between the metal and the flakes. Instead of being collected for subsequent use, the double ribbon 17 of film glass can also be introduced directly into a metal melt which is agitated in any suitable manner to cause fracturing of the ribbon. This technique takes advantage of the new or nascent surfaces on the ribbon 17 immediately after formation.

*Treatment of Glass Flakes to Improve Adhesion Thereof With Metals*

In instances where it is desired to use glass flakes of a particular composition to reinforce a metal, and the composition is one that is not wet by that metal, it has been found that various treatments can be used to adapt the glass for such application. As a specific example, the glass film or flakes can be treated with an aqueous solution of a lead salt such as lead chloride, nitrate or acetate, dried, and the resulting dried flake with an exterior coating of a lead salt heated to form a fused lead chloride, oxide or silicate glass surface thereon. A glass flake so produced with a lead-silicate or lead compound glass surface is wettable, for example, by molten aluminum, so that, when admixed therewith, interdiffusion as described between the melt and such surface occurs. Similar interdiffusion between the lead-glass surface and the interior of the glass flake probably also takes place, with the result that a chemically complex structure is formed, but with minimal difficulties from the production standpoint.

It will be apparent that various other surface treatments could be used to facilitate adhesion between the molten metal and the glass flakes. For example, the glass flakes might be treated with an aqueous solution of boric acid or of a boric acid salt, dried and heated, as described, to produce flakes carrying a surface coating of borosilicate glass, which would then be wettable by molten aluminum, for example, when admixed therewith. A similar coating might also be formed with a mixture of lead salts and borates, to provide a surface coating of a lead borosilicate glass.

It has also been found that the glass flakes can be coated with cobalt oxide, for example by applying an aqueous solution of cobaltous formate, drying, and heating as described, and admixed with molten metal. The cobalt oxide layer virtually disappears, either reacting with or diffusing into the glass or the molten metal, or both, with resulting good adhesion between the metal and the glass flakes.

Various other surface treatments can also be used to improve adhesion between glass and metals. In general, any treatment is advantageous which results in a surface coating on the glass of a metal or metal oxide which is wettable by the metal to be reinforced, or which prevents or minimizes deterioration of the glass surface by an adsorbed layer of gases, or both. The lead chloride and boric acid or boric acid salt treatments mentioned above by way of example are instances of surface treatments which accomplish both results. Other examples of surface treating agents include Al, Mg, Cu, Zn, Ag, Sn, MgO, $Al_2O_3$, CuO, $Mo_2O_3$, $MoO_2$, $Mo_2O_5$, ZnO, $Ag_2O$ and SnO. The oxides can be applied as such, for example as dispersions in a drying oil or fugitive wax, or as the halides, nitrates, formates, acetates, or other salts which are convertible to the oxides, either by a separate heating step or upon incorporation into a metal melt. The molybdic oxides may be secured by treating with commercial ammonium molybdate and then decomposing this by heating the glass flakes. Similar treatments with small amounts of ammonium phosphate salts give a surface coating of metaphosphoric acid which also provides good bonding to metals. The metals, or hydrides or carbonyls thereof, for example, can be vaporized inside the tube 15, or in an enclosed zone, where they contact the glass surface to be treated; molten metal can also be sprayed onto glass surfaces through one or the other of the pipes 12 or 13 or through the sprays 20, 21 or 22, or both, or powdered metal preheated to such a temperature that the sensible heat of the glass converts it to a molten condition can be sprayed, dropped, or conveyed onto the surfaces. Cadmium lead alloys and a commercially available alloy of tin and indium containing 50 percent by weight of each wet glass readily, and are also advantageously used for such treatment.

*Preventing or Minimizing Adsorption or Effect Thereof of Gases on Glass Surfaces*

In general any coating of an inorganic compound or metallic oxide or any coating which adheres to a glass surface or may be decomposed to metal by the molten metal, or is compatible with both the metal and the glass, can be used to improve adhesion between a glass surface and metal. The product of coatings of this type which are compatible with both the glass and the metal have previously been discussed. The mere presence of such coatings on glass surfaces minimizes the harmful effect of adsorbed gases. Preferably, a coating applied for such purpose is also hydrophobic, and helps to maintain the fresh or nascent condition of the newly formed glass surfaces of the tube 15. As specific examples of hydrophobic coatings that can be applied to such glass surfaces, fugitive waxes, oils, weak organic acids, such as stearic acid, silanes and silane derivatives such as silicones, silicone salts and siloxanols, organo boron compounds and methacrylate chromic chloride are worthy of mention. The waxes, oils, and weak organic acids constitute merely surface coatings which are hydrophobic and prevent or minimize water vapor and other gas adsorption on the surfaces of glass film or flakes prior to the introduction thereof into a metal melt. Silanes, silane derivatives, and organo boron compounds provide such protective coatings, and are also capable of reaction with the glass further to improve adhesion thereof with the metal, as hereinafter discussed in more detail.

As stated, silane and silane derivative coatings and organo boron compound coatings are particularly advantageous for use to prevent or minimize the adsorption of gases, and consequent attack of glass surfaces which it is desired to adhere to metal. It is well known that silanes and silane derivatives adhere tightly to glass, probably by virtue of actual chemical bonding, which may be through Si—O—Si linkages, and that such coatings are highly water repellent when the silane or silane derivative has, in its molecular structure, any of various hydrophobic radicals. When such a coating is applied to a fresh glass surface it is believed that the coating effectively prevents deterioration thereof by moisture, as described. In addition, however, when the glass flakes are ultimately incorporated in a molten metal, the latter being at a temperature sufficiently high to cause decomposition of the coating, the silicon atoms therefrom are available in a reactive state for modification of the glass surface to improve adherence thereof with the metal.

Still further advantage can be obtained by applying a salt of a silane derivative to a fresh or other glass surface when the salt contains, as the metal portion thereof, a cation capable, as discussed above, of reaction with the glass to form a surface readily wettable by a molten metal. For example, the use of a lead salt of a silane derivative to form a protective coating on one or more of the surfaces of the double ribbon 17 not only provides a protective coating, but also supplies lead oxide and lead for the formation of a lead glass surface on the flakes, either upon incorporation into a metal melt, or upon heating prior to incorporation therein.

Various organo boron compounds are also capable of the same sort of linkage to a glass surface, and contain hydrophobic groups to render them water repellent. Methyl-, ethyl-, isoamyl-, isobutyl-, phenyl-, propyl-, and tolyl-boric acids are specific examples of organo boron derivatives capable of linkage through B—O—Si groups to a glass surface, and containing hydrophobic groups for water repellency. Surface coatings of this type, when heated, either in situ in a molten metal or independently, to a sufficiently high temperature that the compound is decomposed, provide means for forming a borosilicate glass on the surface of the flakes, platelets or films, for the production of readily wettable glasses, as described.

*Reaction Between the Molten Metal and the Glass Flakes*

As an example of a method where flakes react with the molten metal, the incorporation of flakes into an aluminum or aluminum alloy melt may be considered. When the glass flakes contain metal oxides reducible by molten aluminum, for example, PbO or $SiO_2$, an oxidation-reduction reaction between one of these oxides and the molten aluminum to form Al₂O₃ and the corresponding metal can occur at the interface between the molten aluminum and the glass flakes. By maintaining the melt at an appropriate temperature, Al₂O₃ formed at the interface will diffuse into the glass flake, forming a surface coating in situ which is readily wet by the metal. Interdiffusion, as above described, can then occur to give the required adhesion between the molten metal and the glass flakes.

The procedure described above can also be used as a surface treatment for glass flakes that are to be incorporated in other metals. For example, glass flakes can be admixed with molten aluminum, the metal melt brought to an appropriate temperature, and the flakes separated from the melt, as by pouring the molten metal through a ceramic strainer. The treated glass flakes retained by the strainer are then available for incorporation in a metal that it is desired to reinforce, for example lead or zinc, and the excess aluminum can be used for treatment of additional flakes.

In the case of glass flakes containing about 50 percent by weight of $SiO_2$, about 17 percent of CaO, about 15 percent of $Al_2O_3$, and small amounts of MgO, $B_2O_3$, $Na_2O$ and $Fe_2O_3$, it has been found that the above-discussed phenomenon occurs at a substantial rate when the metal is heated to a temperature above about 1350° F. Above this temperature the edges and surfaces of the glass flakes darken and become highly reflective as metallic silicon is formed and at the same time the flakes are wetted by the aluminum and strong bonding is secured. The reaction probably proceeds at temperatures lower than about 1350° F., but at a comparatively slow rate. Where it is feasible to hold an aluminum melt at a lower temperature for an extended period of time, for example, at about 1325° F. for approximately five minutes, at about 1310° F. for about ten minutes, at about 1295° F. for approximately twenty minutes, or at still lower temperatures for longer periods of time, a similar result may be achieved with the identified glass. However, it will be apparent that a comparatively high temperature is advantageous for such treatment of glass flakes because of the greater reactivity of glass components, with resulting facilitation of interdiffusion, as above described.

It has been observed experimentally that the presence of a minor amount of magnesium in molten aluminum improves adhesion between the metal and glass flakes. It is believed that such improvement is attributable, at least in part, to a similar oxidation-reduction reaction between the magnesium in the melt and silica or other metal oxide at the surface of the glass flakes. It is known that magnesium undergoes such a reaction more readily than does aluminum.

Where slight alloying, for example with aluminum or magnesium, of the metal to be reinforced with glass flakes is permissible, the melt can be effected, a small alloying addition of aluminum or magnesium made, and the glass flakes then admixed with the resulting molten alloy. The magnesium, aluminum, or other oxidizable metal in the alloy, if the glass flakes contain an oxide of a metal reducible thereby, as described, will react with such oxide or oxides in the melt to produce, in situ, the surface coating desired for satisfactory wetting, interdiffusion, and, upon cooling, resulting adhesion, between the flakes and the metal.

*Vacuum Treatment*

Still another treatment can be used to improve the adhesion between glass and metal. This treatment involves degasification of the melt after admixture therewith of the glass flakes. Preferably, the melt, with glass flakes therein, is heated to a temperature at which the metal has a relatively low viscosity, and a vacuum is applied to the surface of the melt. With the melt in a fluid condition, and vacuum applied, a substantial portion of the gas originally adsorbed on the surface of the flakes or mechanically entrapped with the flakes can be eliminated from the melt, and adhesion improved. This vacuum technique is suited for use in cooperation with the agitation method for producing fresh or nascent surfaces discussed above.

Stannic and stannous chlorides are examples of materials that can advantageously be used to provide a protective coating to facilitate adhesion between a metal and the flakes. For example, $SnCl_4$ can be pumped as a vapor into the interior of the tube 15 through one or the other of the pipes 12 or 13 at a rate sufficient that a coating forms on the adjacent surfaces of the double ribbon 17. A similar coating can also be applied through nozzles 21, 22 or 23 to the exposed surfaces of the ribbon 17, or a separate treating zone can be used for application thereof.

The tin salts react on the hot glass surface to form stannic oxides and hydrogen chloride vapors. The oxide coated flakes may be introduced into molten metals since they are readily wet. With the stronger reducing metals such as aluminum, magnesium and titanium there is some interaction to form tin and the metal oxides. Whether the tin oxide is present as a separate layer or as a partially reacted and interdiffused layer, good bonding between the glass and the metal is secured.

The term "metallic compositions" as used in the appended claims includes metals, metal alloys and compounds, organic or inorganic, having molecular structures which include metal atoms.

We claim:

1. A metal mass capable of being formed by molding, casting, forging, extruding and the like operations involving at least softening of the metal by heat which has dispersed throughout its mass a quantity of glass flakes coated with a metallic composition different from the metal, said flakes embedded in and adhered to the metal.

2. A metal mass according to claim 1 in which the metal is one of the group consisting of lead and lead alloys.

3. A metal mass according to claim 1 in which the metal is one of the group consisting of aluminum and aluminum alloys.

4. A metal mass according to claim 1 in which the metal is one of the group consisting of zinc and zinc alloys.

5. A glass flake having, adhered to at least one surface thereof, a thermally decomposable hydrophobic coating with a molecular structure which includes cations reactive at elevated temperatures with the glass.

6. A glass flake having, adhered to at least one surface thereof, a thermally decomposable hydrophobic coating with a molecular structure which includes cations reducible to a metallic state by a molten metal.

7. An article comprising a metal matrix, glass flakes embedded therein, and a metal oxide diffused into a portion of the glass and into a portion of the matrix metal.

8. An article comprising a metal matrix and metal oxide coated glass flakes, said flakes embedded in an adhered to the matrix metal.

9. An article comprising a metal matrix and coated glass flakes coated with a metallic composition different from the matrix metal, said flakes embedded in and adhered to the matrix metal.

References Cited in the file of this patent

UNITED STATES PATENTS

| | | |
|---|---|---|
| 220,907 | Arbogast | Oct. 28, 1879 |
| 485,478 | Pollard | Nov. 1, 1892 |
| 727,005 | Shuman et al. | May 5, 1903 |
| 1,104,054 | Linder | July 21, 1914 |
| 1,556,364 | Smith | Oct. 6, 1925 |
| 1,793,529 | Taylor | Feb. 24, 1931 |
| 2,030,476 | Smith | Feb. 11, 1936 |
| 2,143,907 | Blumlein et al. | Jan. 17, 1939 |

(Other references on following page)

UNITED STATES PATENTS

| | | |
|---|---|---|
| 2,233,259 | Harth | Feb. 25, 1941 |
| 2,233,622 | Lytle | Mar. 4, 1941 |
| 2,237,754 | Davies | Apr. 8, 1941 |
| 2,251,726 | Wellech et al. | Aug. 5, 1941 |
| 2,276,615 | Hazelett | Mar. 17, 1942 |
| 2,290,911 | Jones | July 28, 1942 |
| 2,314,804 | Willson | Mar. 23, 1943 |
| 2,430,520 | Marboe | Nov. 11, 1947 |
| 2,559,572 | Stalego | July 3, 1951 |
| 2,616,165 | Brennan | Nov. 4, 1952 |
| 2,656,596 | Conant et al. | Oct. 27, 1953 |
| 2,693,668 | Slayter | Nov. 9, 1954 |
| 2,699,415 | Nachtman | Jan. 11, 1955 |
| 2,717,946 | Peck | Sept. 13, 1955 |
| 2,752,731 | Altosaar | July 3, 1956 |
| 2,771,969 | Brownlow | Nov. 27, 1956 |
| 2,772,987 | Whitehurst | Dec. 4, 1956 |